US011157419B2

(12) United States Patent
Raghunathan et al.

(10) Patent No.: US 11,157,419 B2
(45) Date of Patent: Oct. 26, 2021

(54) DEFRAGMENTATION TECHNIQUES

(71) Applicant: EMC IP Holding Company LLC, Hopkinton, MA (US)

(72) Inventors: Anoop Raghunathan, Ashland, MA (US); Roman Gramc, South Boston, MA (US); Stephen M. Lathrop, Milford, MA (US); David K. Aha, Norfolk, MA (US); Christopher W. Appleby, Holden, MA (US); Garret Bourke, Innishannon (IE); Jeremy J. O'Hare, Westborough, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 64 days.

(21) Appl. No.: 16/803,083

(22) Filed: Feb. 27, 2020

(65) Prior Publication Data

US 2021/0271607 A1 Sep. 2, 2021

(51) Int. Cl.
*G06F 12/12* (2016.01)
*G06F 12/123* (2016.01)
*G06F 12/06* (2006.01)

(52) U.S. Cl.
CPC ........ *G06F 12/123* (2013.01); *G06F 12/0684* (2013.01)

(58) Field of Classification Search
CPC ............. G06F 12/0253; G06F 12/0646; G06F 12/0684; G06F 12/123
USPC ................................ 711/159, 161, 165, 170
See application file for complete search history.

(56) References Cited

U.S. PATENT DOCUMENTS 8,041,907 B1 * 10/2011 Wu ..................... G06F 11/1453 711/161
10,216,949 B1 * 2/2019 McKelvie ........... G06F 21/6227
2008/0104355 A1 * 5/2008 Moore .................. G06F 3/0607 711/170
2018/0210667 A1 * 7/2018 Matsumura ........... G06F 3/0643
2021/0011845 A1 * 1/2021 Huang ................ G06F 12/1009

OTHER PUBLICATIONS

Anton Kucherov, et al, "Data Reduction Techniques for Use With Caching," U.S. Appl. No. 16/743,034, filed Jan. 15, 2020.

* cited by examiner

*Primary Examiner* — Gary J Portka
(74) *Attorney, Agent, or Firm* — Muirhead and Saturnelli, LLC

(57) ABSTRACT

Techniques for processing data may include: receiving source physical storage allocation units that include valid data and one or more holes of unused physical storage, wherein each source physical storage allocation unit has an associated timestamp denoting a most recent destaging time of any data stored on the source physical storage allocation unit; determining an age for each source physical allocation unit based on the associated timestamp of the source physical allocation unit; for each source physical storage allocation unit, determining one of multiple age buckets for the source physical allocation unit based on the age of the source physical allocation unit; and for a first of the age buckets including two source physical allocation units, performing first processing including: relocating at least some valid data from the two source physical storage allocation units to a target physical storage allocation unit.

20 Claims, 8 Drawing Sheets

DEFRAGMENTATION TECHNIQUES

BACKGROUND

Technical Field

This application generally relates to data storage.

Description of Related Art

Data storage systems may include resources used by one or more host systems. The data storage systems and the host systems may be interconnected by one or more communication connections such as in a network. These resources may include, for example, data storage devices such as those included in the data storage systems. These data storage systems may be coupled to the one or more host systems where the data storage systems provide storage services to each host system. Multiple data storage systems from one or more different vendors may be connected and may provide data storage services for the one or more host systems.

A host may perform a variety of data processing tasks and operations. For example, an application may executed on the host and the application may issue I/O (input/output) operations, such as data read and write operations, sent to the data storage system.

The host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. The host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for processing data comprising: receiving a plurality of source physical storage allocation units, wherein each of the plurality of source physical storage allocation units includes valid data, includes one or more holes of unused physical storage, and has an associated timestamp denoting a most recent destaging time of any data stored on said each source physical storage allocation unit; determining an age for each of the plurality of source physical allocation units based on the associated timestamp of said each source physical allocation unit; for each of the plurality of source physical storage allocation units, determining one of a plurality of age buckets for said each source physical allocation unit based on the age of said each source physical allocation unit; and for a first of the plurality of age buckets including two of the plurality of source physical allocation units, performing first processing including: relocating at least some valid data from the two source physical storage allocation units to a target physical storage allocation unit. The first processing may include determining a timestamp for the target physical storage allocation unit using at the two associated timestamps for the two source physical storage allocation units. The timestamp for the target physical storage allocation unit may be determined as a most recent one of the two associated timestamps for the two source physical storage allocation units. The at least some valid data from the two source physical storage allocation units may be stored on the target physical storage allocation unit in a compact packed format and wherein the target physical storage allocation unit may have no holes of unused physical storage. Each of the plurality of source physical allocation units may include compressed data.

In at least one embodiment, processing may include receiving a plurality of write I/O operations that write first data to a plurality of logical addresses; storing the first data in a cache; obtaining the first data from the cache; compressing the first data obtained from the cache and generating first compressed data; storing the first compressed data on a first of the plurality of source physical storage allocation units in a compact packed format; and determining the associated timestamp for the first source physical storage allocation unit denoting a destaging time of the first data stored on the first physical storage allocation unit. At a first point in time, each of the first source physical storage allocation unit and a second of the plurality of physical storage allocation units may include valid data stored in a compact packed format. The first physical storage allocation unit may include a first number of compressed data portions and the second physical storage allocation unit may include a second number of compressed data portions, and wherein the second number is different than the first number. The first physical storage allocation unit may include a first amount of compressed data and the second physical storage allocation unit may include a second amount of compressed data, and wherein the first amount is different than the second amount.

In at least one embodiment, the target physical storage allocation unit may be allocated from a first of a plurality of storage tiers, and wherein the first storage tier may be selected in accordance with the first age bucket including the two source physical allocation units. The first age bucket may denote an oldest age with respect to a plurality of ages associated with the plurality of age buckets. The first storage tier may be a lowest performance tier of the plurality of storage tiers. The first age bucket may denote a youngest age with respect to a plurality of ages associated with the plurality of age buckets. The plurality of storage tiers may be ranked in terms of performance from a highest performance ranked one of the plurality of tiers to a lowest performance ranked one of the plurality of tiers, and wherein the first storage tier may be any of the plurality of tiers other than the lowest performance ranked one of the plurality of storage tiers.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF EMBODIMENT(S)

Figure 1:
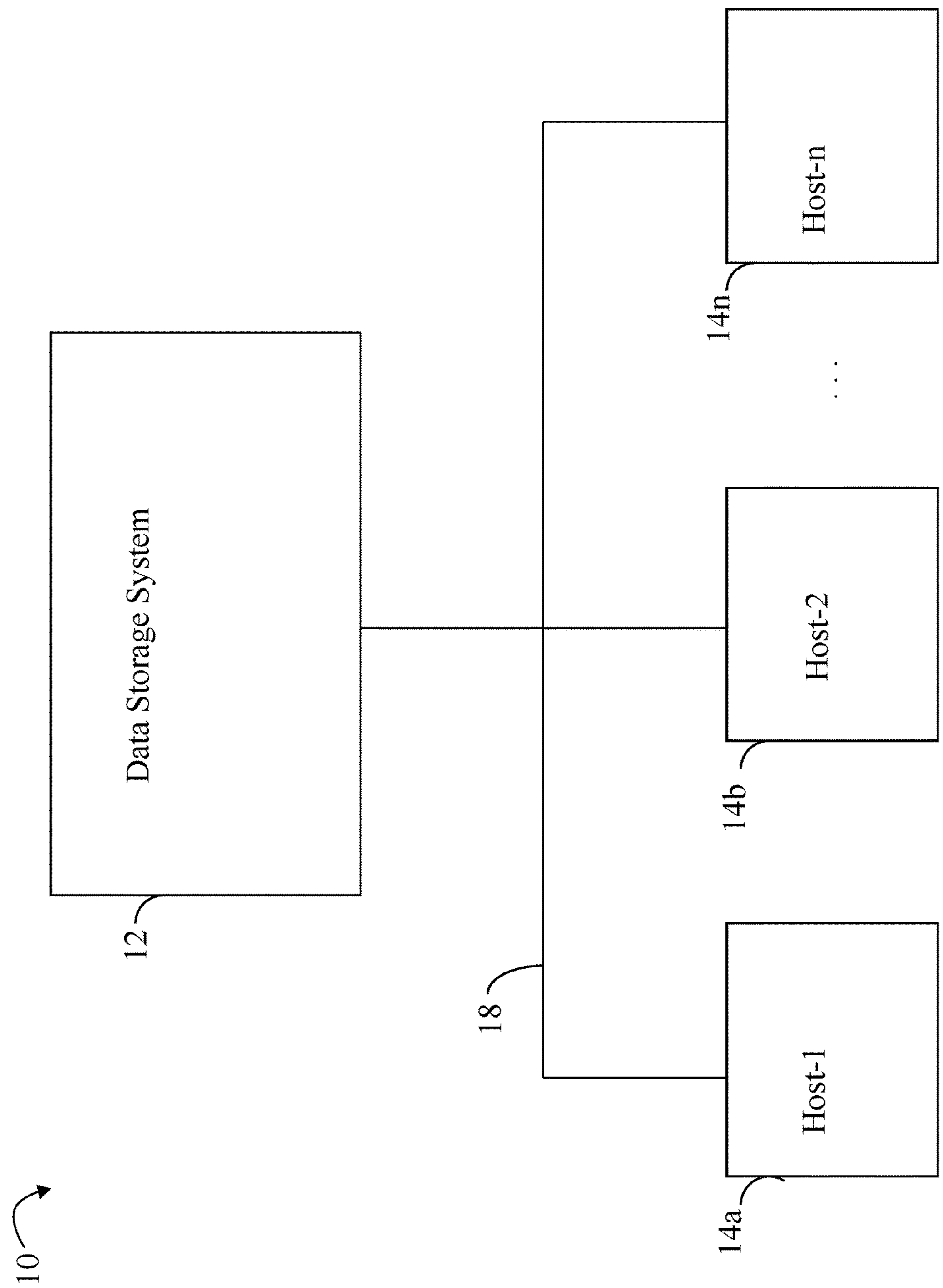
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14*a*-14*n* through the communication medium 18. In this embodiment of the system 10, the N hosts 14*a*-14*n* may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14*a*-14*n* may access and communicate with the data storage system 12, and may also communicate with other components included in the system 10.

Each of the host systems 14*a*-14*n* and the data storage system 12 included in the system 10 may be connected to the communication medium 18 by any one of a variety of connections as may be provided and supported in accordance with the type of communication medium 18. The processors included in the host computer systems 14*a*-14*n* may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14*a*-14*n* and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14*a*-14*n* may issue a data request to the data storage system 12 to perform a data operation. For example, an application executing on one of the host computers 14*a*-14*n* may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
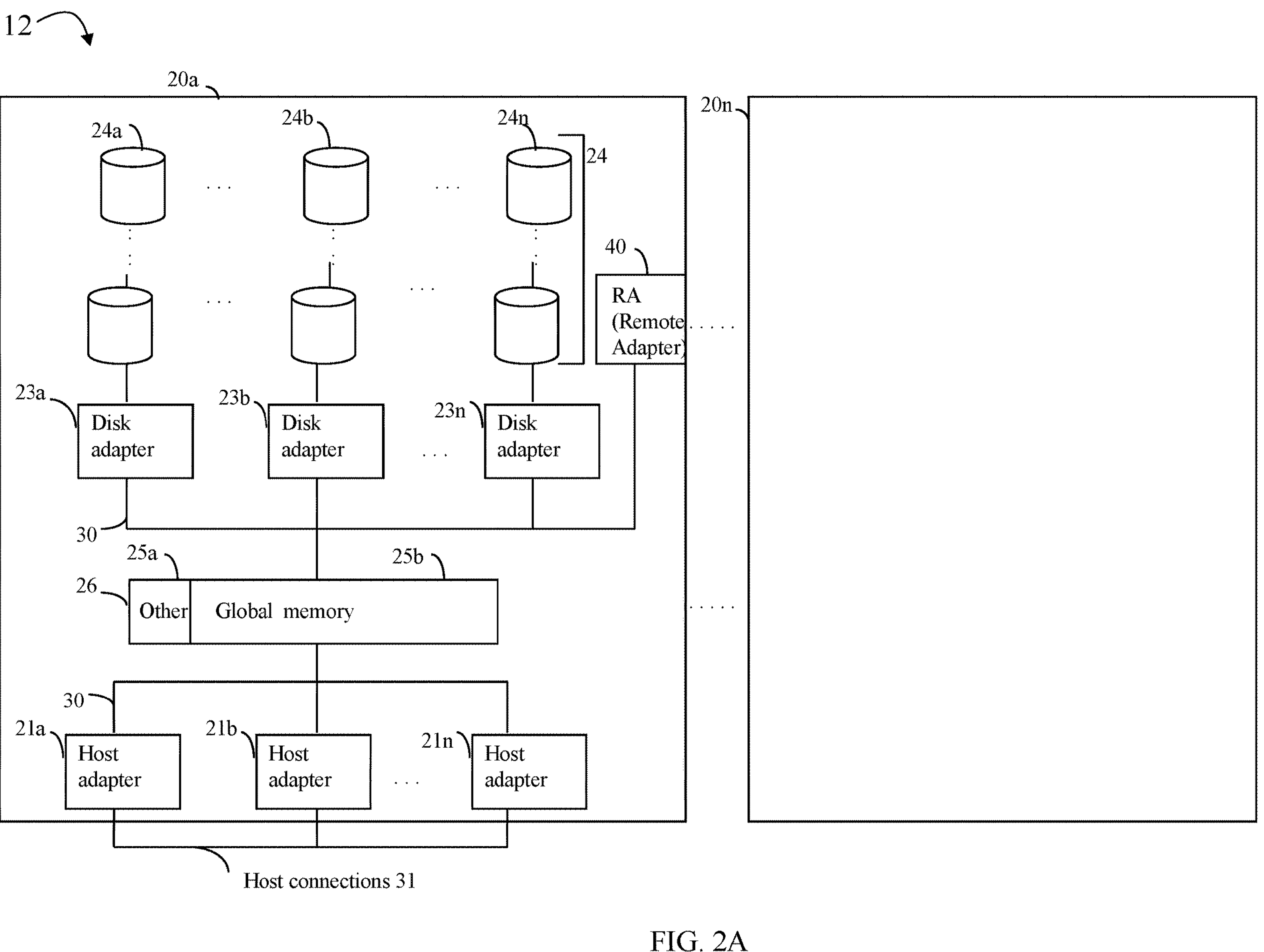
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20*a*-20*n* as may be manufactured by one or more different vendors. Each of the data storage systems 20*a*-20*n* may be inter-connected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20*a*. It should be noted that a similar more detailed description may also apply to any one or more of the other elements, such as 20*n*, but have been omitted for simplicity of explanation. It should also be noted that an embodiment may include data storage systems from one or more vendors. Each of the data storage systems 20*a*-20*n* may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20*a*, may include a plurality of disk devices or volumes, such as the arrangement 24 consisting of n rows of disks or more generally, data storage devices, 24*a*-24*n*. In this arrangement, each row of the disks may be connected to a disk adapter ("DA") or director responsible for the backend management of operations to and from a portion of the disks 24. In the system 20*a*, a single DA, such as 23*a*, may be responsible for the management of a row of disks, such as row 24*a*. In a data storage system, a backend DA may also be referred to as a disk controller. The DA may perform operations such as reading data from, and writing data to, the physical devices which are serviced by the DA.

It should be noted that, more generally, the physical devices or data storage devices 24*a*-24*n* may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

In at least one embodiment, the data storage system may include multiple tiers of PDs. Each tier may include PDs of the same media type. The multiple tiers may have a performance ranking, from highest performance to lowest performance, depending on the particular characteristics of the PDs in each tier. For example, an embodiment may include 3 tiers—tier 1 being the highest performance tier of flash-based storage devices; tier 2 being a mid level performance tier of 15K RPM PDs; and tier 3 being a lowest level performance tier of 10K RPM PDs. In at least one embodiment, a data storage optimizer may be used to automatically and dynamically relocate data portions between different ones of the storage tiers depending on the I/O workload of the data portions over time. For example, the data storage optimizer may be the Fully Automated Storage Tiering (FAST) software by Dell EMC. The data storage optimizer may relocate data portions among the different tiers at various times in attempts to improve and optimize data storage system and I/O performance. For example, the data storage optimizer may store the data portions having the highest I/O workloads on the highest performance tier(s). Data portions that have low or idle I/O workloads may be relocated to the lowest performance tier. The data portions may be automatically relocated by the data storage optimizer among the different tiers as their associated I/O workloads change over time.

Also shown in the storage system 20*a* is an RA or remote adapter 40. The RA may be hardware including a processor used to facilitate communication between the data storage systems, such as between two of the same or different types of data storage systems.

The system 20*a* may also include one or more host adapters ("HAs") or directors 21*a*-21*n*. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25*b* may be used to facilitate data transfers and other communications between the DAs, HAs and RAs in a data storage system. In one embodiment, the DAs 23*a*-23*n* may perform data operations using a cache that may be included in the global memory 25*b*, for example, in communications with other the disk adapters or directors, and other components of the system 20*a*. The other portion 25*a* is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage such as logical devices which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25*b*) and marked as write pending. Once written to the cache, the host may be notified that the write operation has completed. At a later point time, the write pending data may be destaged from the cache to the physical storage device, such as the non-volatile physical storage device (e.g., the PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
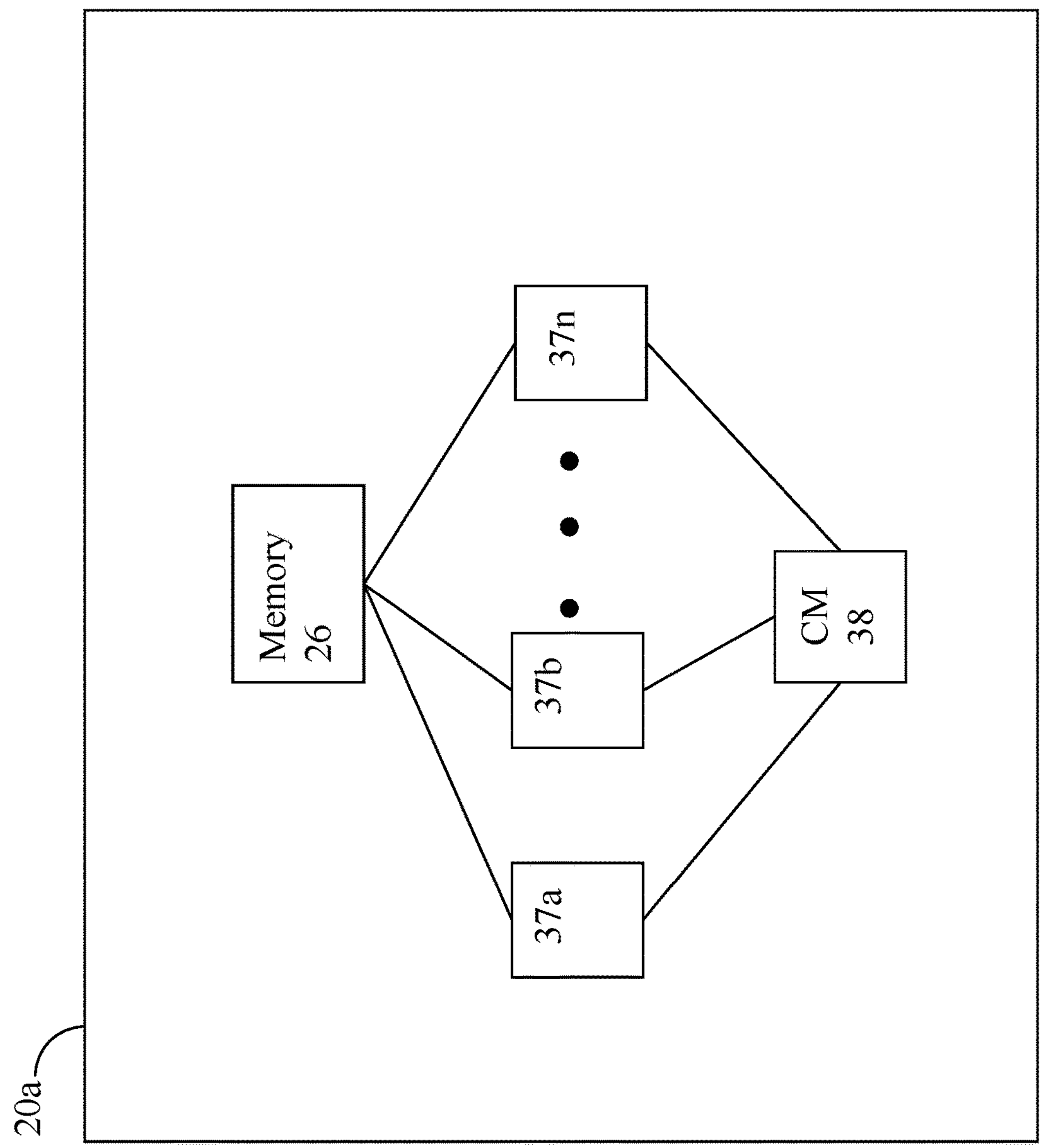
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37*a*-37*n* coupled to the memory 26. Each of the directors 37*a*-37*n* represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37*a*-37*n*. Each of the directors 37*a*-37*n* may be coupled to the CM 38 so that any one of the directors 37*a*-37*n* may send a message and/or data to any other one of the directors 37*a*-37*n* without needing to go through the memory 26. The CM 38 may be implemented using conventional MUX/router technology where a sending one of the directors 37*a*-37*n* provides an appropriate address to cause a message and/or data to be received by an intended receiving one of the directors 37*a*-37*n*. In addition, a sending one of the directors 37*a*-37*n* may be able to broadcast a message to all of the other directors 37*a*-37*n* at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as the HAs, the DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression. An embodiment in accordance with the techniques herein may use any suitable compression algorithm. In at least one embodiment, data may be stored on the backend PDs in compressed form. Compression may be enabled or disabled at one or more different levels of granularity supported in an embodiment. For example, compression may be enabled or disabled at a per logical device or LUN level. In some embodiment, compression may be enabled or disabled on a sub-LUN level, such as for different logical address portions of a LUN.

In at least one embodiment, data compression may be performed as part of the I/O path or data path described below in more detail when destaging write pending data from the cache to the backend PDs. For example, first data may be write pending data stored in the cache. Processing may be performed to store the first data in compressed form on a physical storage location of a PD. As part of destaging the first data from the cache, the first data is read from the cache, compressed and then stored in a physical storage location on a backend PD.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and the control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from the data storage management software, such as a data storage system management application, executing on a management system, such as another computer system or other device with a processor that is connected to the data storage system 12. Such commands may perform an action with respect to a current data storage system configuration. Such commands may be, for example, to establish or modify data services; view performance or health of various system components and storage entities; provision storage for LUNs; perform user account management; create, modify or delete a logical storage entity (e.g., a LUN, a RAID group, storage group (SG) that is a logically defined group of one or more LUNs); and the like.

As noted above, a data storage system may include multiple tiers of physical storage where each such tier includes PDs of a particular type of storage media and associated performance characteristics. In efforts to decrease the cost of a data storage system, data reduction techniques such as compression may be employed to more efficiently utilize the available backend physical storage. Additionally, the tiers of the data storage system may include a lower performance tier of lower performance PDs which typically have a lower associated cost per GB of storage than more expensive higher performance PDs, such as flash-based drives or other non-volatile SSDs, of higher performance tiers.

At least one existing system may use preconfigured physical storage portions or physical storage allocation units (PSUs) of different sizes. In such an existing system, for example, physical storage on the backend PDs may be preconfigured into PSUs of various sizes including 8 KB (kilobytes), 16 KB, 24 KB, 32 KB, 40 KB, and so on, for subsequent 8 KB increments up to a specified maximum size such as 128 KB. In such a system, a data portion, such as a single 128 KB track of data, when decompressed may be the specified maximum size. The track may be a logical track having an associated logical address on a LUN. The data portion may be compressed and then stored in its compressed form on backend PDs. A preconfigured PSU may be selected for storing the compressed data portion where the PSU selected has the smallest size capable of storing the entire compressed data track. For example, the compressed data may have a size of 33 KB and the preconfigured PSU selected for storing the compressed data may have a size of 40 KB. Use of such preconfigured and preallocated PSUs of various sizes may provide for ease of use and speed when allocating and deallocating physical storage for storing data that may be compressed. However, one drawback is that there may be an undesirable amount of unused physical storage in connection with allocated preconfigured PSUs storing compressed data. For example, reference is made to storing the compressed 33 KB track of data in a PSU of size 40 KB. In this case, 7 KB of the PSU may be characterized as allocated for use but wasted since the 7 KB is not used to store any data.

As a result, an embodiment in accordance with the techniques herein may provide for use of compaction techniques when storing compressed data. In at least one embodiment, physical storage portions or PSUs may have the same size, such as 6 megabytes (MB). Compaction techniques may be utilized in which multiple compressed tracks or chunks of data may be stored in their respective compressed form in a single PSU. In one aspect, the compaction techniques provide for tightly packing compressed data into the PSUs of the physical storage media of the backend PDs. For example, 200 128 KB tracks of data may be compressed where each compressed track has an average compressed size of 30 KB. In this case the compressed 200 tracks of data may be stored in a single PSU. In at least one embodiment, the PSU may be filled with multiple compressed tracks of data at approximately the same time (e.g., within specified tolerances or limits) and a timestamp (TS) may be associated with the PSU indicating the time the PSU was filled with the compressed data.

When a particular one of the tracks having its current data stored on a first PSU is rewritten with new data, the current data stored in its compressed form on the first PSU becomes stale or outdated and may no longer be needed. The new data may be written to a different physical location of a second PSU that is different from the first PSU storing the compressed current data. The physical storage location occupied by the compressed current data on the first PSU may be designated as unused physical storage referred to as a hole or fragment. As many logical tracks of data are rewritten and updated over time, the number of holes or fragments increases in the allocated PSUs storing the compressed data.

Various techniques such as defragmentation or garbage collection may be used to reclaim and reuse the physical storage associated with the holes or fragments. In an embodiment in accordance with the techniques herein, the backend PDs may be periodically defragmented to remove the holes or unused fragments. In at least one embodiment, defragmentation may include rearranging the layout of data stored on the physical storage media in order to have valid data of multiple compressed tracks occupy contiguous storage locations and reduce or remove the number of existing holes or fragments. In this manner, numerous holes or fragments of small amounts of unused storage may also be combined and thus reclaimed to result in a single larger contiguous amount of space on the storage media that is available for storing data.

In at least one embodiment in accordance with the techniques herein, each PSU may have an associated first TS used in determining the age of the PSU. Initially, a PSU may be allocated filled with data from multiple compressed tracks such as when the data is destaged from the cache to the backend PDs. The first TS of the PSU may denote the time at which the allocated PSU is initially filled with data that has been destaged and compressed. An embodiment may also associate a second TS with each PSU. Initially, the second TS of the PSU may be the same as the first TS of the PSU. As time progresses, allocated PSUs storing compressed data may accumulate holes or fragments of storage. Thus the PSUs may include both holes or fragments as well as good or valid data (e.g., denoting non-stale data currently stored at one or more logical addresses).

In at least one embodiment in accordance with the techniques herein, defragmentation may be performed that includes moving and combining valid data from multiple fragmented source PSUs into a new single target PSU. In accordance with the techniques herein, the particular source PSUs selected may be based on the age associated with each source PSU. The age of each source PSU may be determined based on the first TS associated with each source PSU. The selected PSUs may have approximately the same age, within a specified tolerance or limit. As a result of the defragmentation, the target PSU may have an associated first TS determined as the most recent of all the first TSs associated with the source PSUs. Also, the second TS of the target PSU may be updated and determined as the oldest of all TSs associated with the source PSUs combined into the target PSU. More specifically, the second TS of the target PSU may be determined as the oldest of the second TSs associated with the source PSUs. The foregoing may be repeated in connection with subsequent defragmentation at a later point in time where the target PSU may subsequently become a source PSU on a next iteration of defragmentation.

In at least one embodiment in accordance with the techniques herein, age buckets may be defined. Each age bucket may be associated with a different time span or window of time. The fragmented PSUs may be separated or placed into particular ones of the age buckets based on the ages of the fragmented PSUs. The ages of the fragmented PSUs may be determined based on the first TSs associated with the fragmented PSUs. The first TS of a fragmented PSU denotes the most recent time that write data was destaged from the cache and stored on the fragmented PSU. Fragmented PSUs within the same age bucket may be selected as source PSUs from which valid data may be copied to a new target PSU.

In at least one embodiment, the first TS and the second TS associated with a PSU may be used as an indicator regarding the efficiency of defragmentation. For example, if the difference between first TS and the second TS does not exceed a specified maximum, then defragmentation performed using the PSU may be characterized as efficient. Otherwise, defragmentation performed using the PSU may be characterized as inefficient. In at least one embodiment, the difference between the first TS and the second TS of a source PSU in a particular age bucket may be used in selecting multiple source PSUs of the particular age bucket that are combined into a target PSU. For example, multiple source PSUs of the particular age bucket may be combined into the same target PSU if the difference between the first TS and the second TS of each source PSU does not exceed the specified maximum. Multiple source PSUs of the particular age bucket may be combined into the same target PSU if the difference between the first TS and the second TS of each source PSU is equal to or greater than the specified maximum. In this manner, within an age bucket, source PSUs combined may be selected based on the difference between the first TS and the second TS of each PSU.

In at least one embodiment, the particular age bucket may be used to select a particular storage tier from which to allocate a new target PSU. As data ages and more time elapses since the last or most recent time the data stored at a logical address was written, the expectation or the probability of another future write of the data to the logical address also further decreases. Generally, the data stored on PSUs in one particular age bucket may have a lower write probability than PSUs in other younger age buckets, whereby data on PSUs in the oldest age bucket may have the lowest write probability of all PSUs in all the defined age buckets. Data stored on PSUs of the youngest age bucket may have the highest write probability of all PSU in all the defined age buckets. The foregoing is based on the assumption that past I/O access patterns are an indicator of future I/O access patterns. In at least one embodiment in accordance with the techniques herein, older data in the older age buckets may be targeted for storage on lower performance media such as on PDs of the lowest performance storage tier. Thus, an embodiment may select a target PSU in the lowest performance storage tier, for example, if the source PSUs are in the oldest defined age bucket. In a similar manner, an embodiment may select a target PSU in the highest performance storage tier, for example, if the source PSUs are in the youngest defined age bucket. At least one embodiment may select a target PSU in any storage tier other than the lowest performance ranked tier, for example, if the source PSUs are in the youngest defined age bucket.

In at least one embodiment, PDs of the different storage tiers may be configured in RAID groups. The amount of system resources used to store data to a physical storage location on a backend PD may vary with the particular RAID group level and configuration. Different RAID levels, such as RAID-5 and RAID-6 incur an additional penalty when writing data to a physical location in the RAID group. RAID-6 provides block-level striping with double distributed parity. RAID-5 provides block-level striping with distributed parity. The penalty in terms of extra reads and writes incurred when writing to a RAID group is less for a RAID-5 group than a RAID-6 group. For example, RAID-6 algorithms may have double parity information such that writing data to a storage location in a RAID-6 RAID group may incur an additional penalty. For example, each write operation that writes to a storage location in a RAID-6 RAID group requires reading the data, reading the first parity, reading the second parity, writing the data, writing the first parity and then finally writing the second parity. RAID-6 can tolerate up to 2 drive member failures. RAID-5 incurs less of a write performance penalty than RAID-6 but can tolerate a single drive member failure. Thus, storing data in a RAID-6 group provides a higher level of data protection than a RAID-5 group. However, the write penalty due to the additional processing required to write to a RAID-6 RAID group for data expected to be frequently rewritten may be undesirable. As a result, the particular age bucket of the source PSUs may be used in selecting a RAID group from which the target PSU is located. For example, for source PSUs located in the youngest age bucket, processing may allocate a target PSU from a RAID-5 group rather than a RAID-6 group in order to reduce the write penalty. In contrast, for source PSUs located in the oldest age bucket, processing may allocate a target PSU from either a RAID-5 group or a RAID-6 group since data of the target PSU has a low probability of being rewritten.

An embodiment in accordance with the techniques herein provides for segregating PSUs using age for a PSU where the age may be determined based on the most recent or latest destaging time of any write data stored on the PSU. Data collected by the inventors has demonstrated that as systems mature, it is common for 50%-80% of the data to no longer be accessed. Keeping older data that has not been accessed for a long time period together avoids problems that may occur when combining the older data with newer, younger data that tends to be rewritten causing fragmentation. Over time, use of the techniques herein reduces fragmentation by grouping valid data together in the same PSU based on age.

The foregoing and other aspects of the techniques are described in more detail in the following paragraphs.

The following paragraphs describe embodiments in which non-limiting examples are provided of particular sizes or thresholds for purposes of illustration. More generally, the techniques herein may be used in connection with any suitable sizes, thresholds, and the like, ad are not limited to those described herein.

In following paragraphs, the size of each PSU may be 6 MB. Data may be stored in the case in chunks or tracks that are each 128 KB in size. Data may be destaged from the cache to backend PDs as part of the I/O or data path. As each track of cached data is destaged from the cache, it may be optionally compressed. Subsequently, the compressed form of the data may be stored on physical storage of a PSU included in a backend PD.

Figure 3:
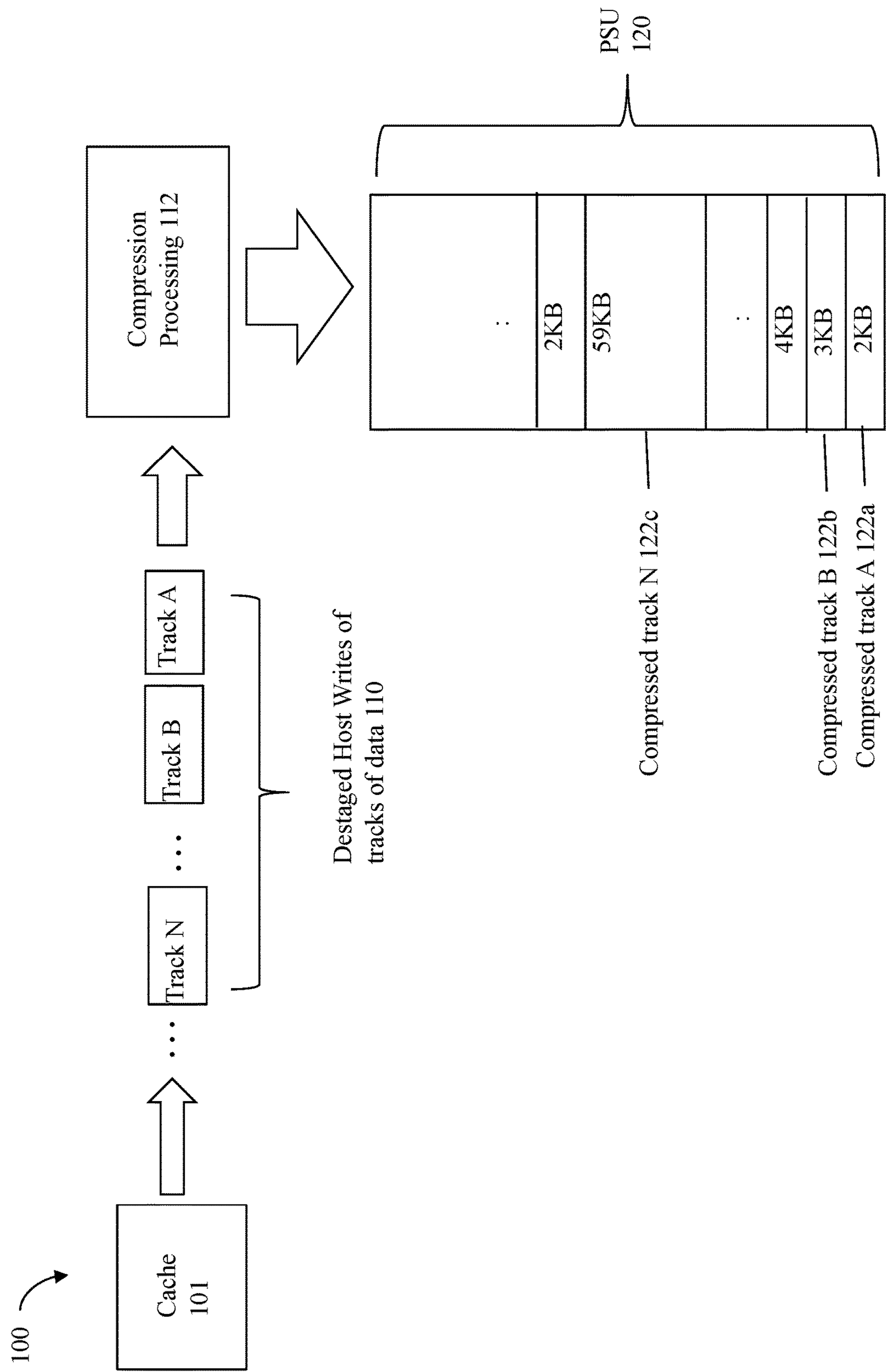
FIG. 3 is an example illustrating data being destaged from the cache, compressed, and stored in a tightly compact format on a physical storage unit (PSU) in an embodiment in accordance with the techniques herein.

Referring to FIG. 3, shown is an example illustrating processing of data destaged from the cache in an embodiment in accordance with the techniques herein. The example 100 illustrates tracks of data 110 as they are destaged from the cache 101. Each of the tracks in 110 may correspond to a track of data written by a host or other client of the data storage system. In this example, the tracks of data 110 may be input to the compression processing 112 to generate compressed data for each track. For each 128 KB track of data in 110, the compression processing 112 may generate a corresponding compressed track of data stored in the PSU 120.

Processing may be performed to allocate a PSU that may then be sequentially filled with compressed data corresponding to tracks of data destaged from the cache. Once the PSU has been filled or consumed by storing compressed tracks of data, another PSU may be similarly allocated and filed with compressed data corresponding to tracks of data destaged from the cache. The foregoing may be continually performed as data is destaged from the cache. In the example 100, the PSU 120 may be the current PSU being filled with compressed data corresponding to tracks of data destaged from the cache. As described below in more detail, more generally, storing or filling the PSU 120 with compressed tracks of data may stop based on one or more conditions that may be specified in an embodiment.

Compressed tracks of data generated by the compression processing 112 may be rounded up in size to the next 1K boundary and are tightly packed within the PSU 120. For example, track A of 110 may have a resulting compressed size of 2 KB as denoted by 122*a*; track B of 110 may have a resulting compressed size of 3 KB as denoted by 122*b*; track N of 110 may have a resulting compressed size of 59 KB, and so on. As the tracks of data 110 are sequentially destaged from the cache 101 and compressed (112), the compressed tracks of data may be stored on the PSU 120 with each next track of compressed data beginning on the next 1 KB boundary. Thus the logical sequential order in which the compressed tracks of data are stored on the PSU 120 may correspond to the sequential order in which the compressed tracks are output by compression processing 112 and may also correspond to the sequential order in which the tracks of data 110 are destaged from the cache. The compressed tracks are stored in the PSU 120 in a compacted or packed format where each compressed track of data begins on a next 1 KB boundary. Thus the compressed tracks stored in the PSU 120 may be stored at logically contiguous locations.

In at least one embodiment, when physical storage is requested for another PSU to store compressed tracks of data, a free PSU may be allocated and marked as being in the "in-allocating" state. After each PSU is consumed and filled with compressed tracks of data, the "in-allocating" state indication of the PSU is cleared. Additionally, various metadata (MD) associated with the PSU just filled may be updated. For example, a first TS of the MD for the PSU may be updated to indicate the time that the compressed tracks of data were stored on the PSU. As also discussed in more detail elsewhere herein, the first TS of the PSU also denotes the most recent time or newest time associated with write data stored in the PSU.

When initially filling the PSU 120 as part of the I/O flow of compressed data as illustrated in FIG. 3, the window of time during which the PSU 120 is filled may be relatively small, such as on the order of a few milliseconds, where the time at which each compressed data track is written to the storage may be about the same. In such an embodiment, the first TS of the PSU 120 denoting the most recent TS associated with data stored on the PSU 120 may be the time at which the last compressed track of data is written to the PSU 120 in connection with destaging data from the cache. Additionally, a second TS of the MD for the PSU 120 may also be updated. Generally, the second TS denotes the oldest time associated with write data stored in the PSU. The second TS denotes the oldest destaging time of any write data stored on the PSU. The first TS denotes the most recent destaging time of any write data stored on the PSU. Initially, the first TS and the second TS for the PSU 120 are the same. Thus, after the PSU 120 has initially been filled with compressed tracks, the second TS of the MD for the PSU 120 may be initialized to have the same value as the first TS.

Additionally, once the PSU 120 has been filled with compressed tracks, additional MD for the PSU 120 that may be updated includes, for example, the number of tracks of compressed data stored in the PSU 120, and the total size of the data stored in the PSU 120. An embodiment may also store additional information in the MD for the PSU 120. For example, the MD for the PSU 120 may also include an indicator or value denoting an achieved compression ratio or level of compressibility. For example, an embodiment may store the average compression ratio for the PSU 120 in the MD for the PSU 120. The average compression ratio may be computed, for example, as a ratio of the compressed size of the data stored in the PSU 120 with respect to the uncompressed size of the data stored in the PSU 120. The uncompressed size of the data stored in the PSU 120 may be calculated as the number of compressed tracks stored in the PSU 120 multiplied by the size of each track (e.g., 128 KB).

Because the size of each of the compressed tracks stored in the PSU 120 may vary, the number of tracks stored in each PSU may also vary. An embodiment in accordance with the techniques herein may specify one or more conditions denoting when to stop initially filling the PSU 120 with data. Consistent with discussion elsewhere herein when processing stops filling the PSU 120 with data, the "in-allocating" state indication of the PSU may be cleared. An embodiment may stop filling the PSU 120 with compressed data when any one of the specified conditions is met. For example, an embodiment may specify a maximum number of data tracks that may be stored within a single PSU. An embodiment may specify a maximum amount of time that may elapse when initially filling a single PSU. Once this maximum amount of time has elapsed, no further data may be stored to the PSU currently being filled. Obviously processing may stop storing compressed tracks on the PSU 120 once no additional data can be stored in the PSU 120 (e.g., when all 6 MB of the PSU 120 have been consumed with storing compressed tracks of data).

In at least one embodiment, as noted above, a maximum number of tracks may be stored in any single allocation unit of physical storage. For example, the maximum number of tracks that may be stored in a single allocation unit of physical storage may be 948, or more generally, any suitable maximum.

FIG. 3 illustrates storing a compressed tracks of data in a compacted or packed format in the PSU 120. In a similar manner, other PSUs may be allocated and filled with compressed data as the cached data is destaged from the cache and then compressed prior to be stored in a PSU. Each PSU that is allocated may be filled with compressed data having the same temporal aspect in that all such compressed data initially stored on the same PSU is destaged from the cache at approximately the same time as indicated by the first TS of the PSU.

An existing compressed track of data stored on the PSU 120 may be rewritten where there is a change or modification to the original data. The updated data may now compress to a different resulting compressed size than the compressed size of the original user data. For example, consider track A having its compressed data 122*a* stored on the PSU 120. Track A may correspond to data written at a first logical address. Thus element 122*a* denotes the original compressed data written to the first logical address where the original compressed data has a 2 KB size. At a later point in time, another write to the first logical address may write new data that has a compressed size of 75 KB. Thus, the rewritten compressed data of size 75 KB is unable to fit into the currently allocated 2 KB storage space of 122*a*. As a result, the newly compressed data of size 75K may be rewritten in another storage location of another PSU that is currently being filled. The 2 KB of physical storage 122*a* on the PSU 120 is now a a hole or fragment of unused storage. As the number of these unused fragments or holes of storage accumulate, it may be necessary to defragment the storage space.

Figure 4:
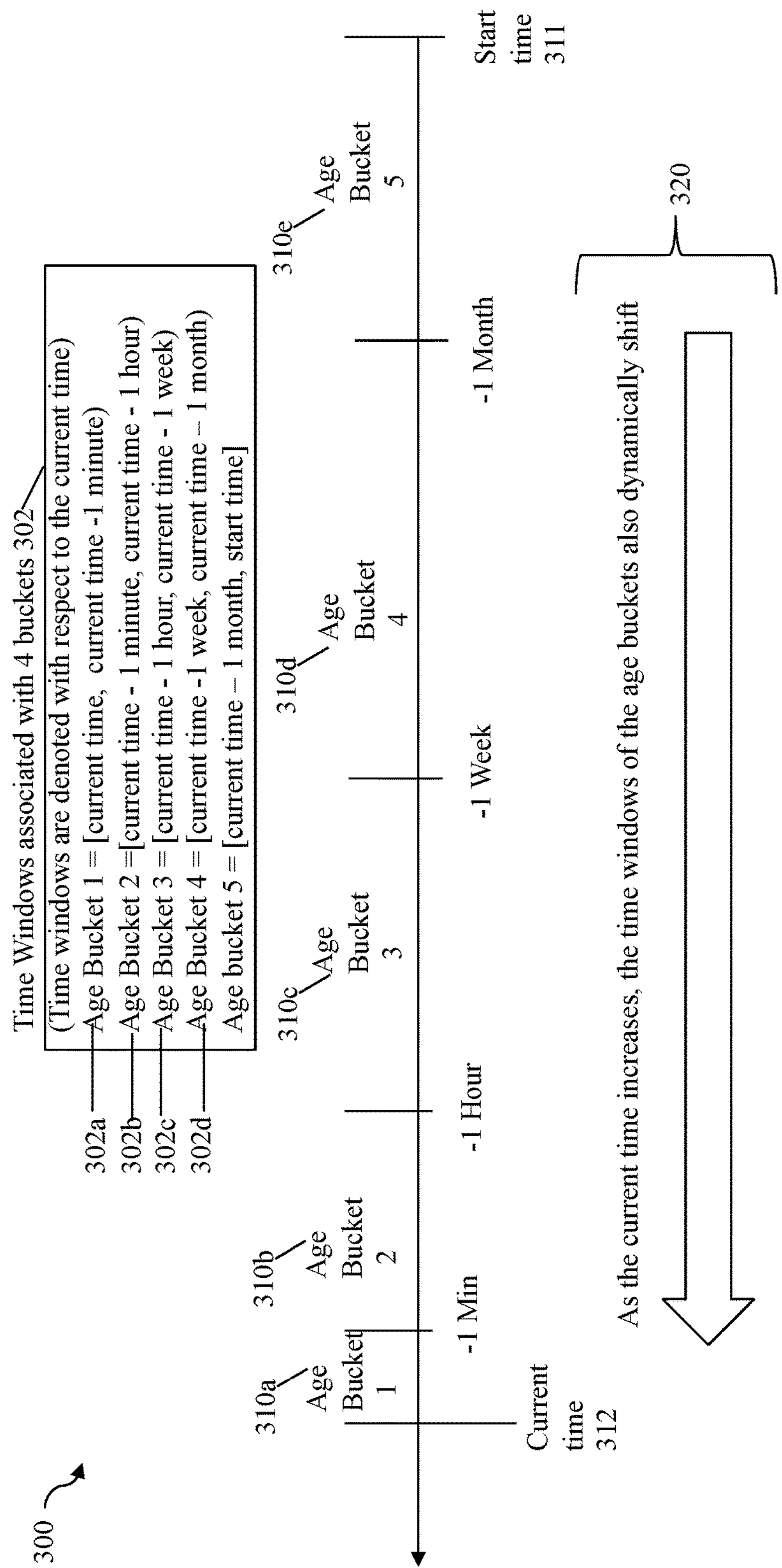
FIG. 4 is an example illustrating age buckets that may be defined and used in an embodiment in accordance with the techniques herein.

Referring to FIG. 4, shown is an example of age buckets that may be used in an embodiment in accordance with the techniques herein. The example 300 defines 5 age buckets with respect to the current time 312. The age bucket 1 310*a* denotes ages that are less than 1 minute. The age bucket 1

310*a* corresponds to a first window of time 302*a* represented by the time range [current time, current time−1 minute). The age bucket 2 310*b* denotes ages that are equal to or greater than 1 minute and less than 1 hour. The age bucket 2 310*b* corresponds to a second window of time 302*b* represented by the time range [current time−1 minute, current time−1 hour). The age bucket 3 310*c* denotes ages that are equal to or greater than 1 hour and less than 1 week. The age bucket 3 310*c* corresponds to a third window of time 302*c* represented by the time range [current time−1 hour, current time−1 week). The age bucket 4 3104 denotes ages that are equal to or greater than 1 week and less than 1 month. The age bucket 4 310*d* corresponds to a fourth window of time 302*d* represented by the time range [current time−1 week, current time−1 month). The age bucket 5 310*e* denotes ages that are equal to or greater than 1 month. The age bucket 5 310*e* corresponds to a fifth window of time 302*e* represented by the time range [current time−1 month, start time], where start time 311 represents the starting time or oldest time possible. The start time 311 may denote, for example, the first or earliest point in time when data may have been destaged and stored on a PSU.

As denoted by 320, as the current time increases from right to left, the time windows of the age buckets 310*a-d* also dynamically shift.

In at least one embodiment, a TS may denote a date and time, such as 1 p.m. Jan. 10, 2020. An age may be determined with respect to a TS based on a difference denoted between the current time and the TS. For example, assume that a first point in time corresponding to a date and time may be expressed by a first numeric quantity. Any point in time subsequent to the first point in time may be expressed by a second numeric quantity that is greater than the first quantity. In such an embodiment, an age may be determined by subtracting the TS from the current time (e.g., current time−TS). For example, an age of 30 seconds associated with a PSU means that data was last or most recently written to the PSU 30 seconds ago (e.g., 30 second prior to the current point in time). In at least one embodiment, an age for the PSU may be determined using the first TS associated with the PSU, where the first TS denotes the most recent destaging time of any write data stored on the PSU. The age of the PSU may be determined as the difference between the current time and the first TS of the PSU.

Generally, an embodiment may have any number of defined age buckets and each such each bucket may denote any suitable age range. For example, as an alternative to the 4 buckets illustrated in the FIG. 4, an embodiment may have 5 age buckets as follows: bucket 1 denoting ages less than 1 week; bucket 2 denoting ages greater than or equal to 1 week and less than 1 month; bucket 3 denoting ages greater than or equal to 1 month and less than 6 months; bucket 4 denoting ages greater than or equal to 6 months and less than 1 year; and bucket 5 denoting ages greater than 1 year.

For purposes of example, the following paragraphs describe performing defragmentation in an embodiment in accordance with the techniques herein using the 5 age buckets as described above in connection with FIG. 4.

Figure 5:
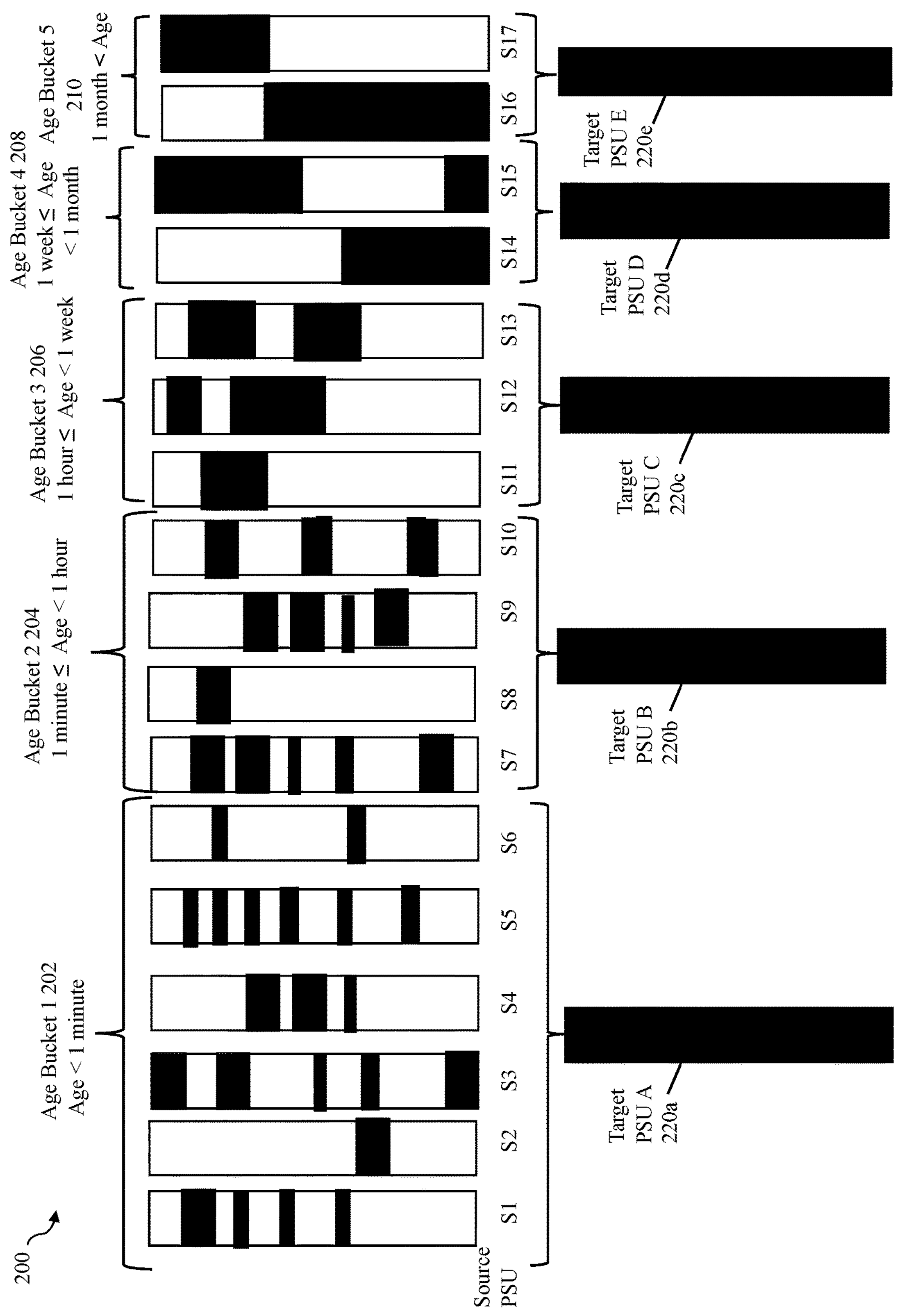
FIG. 5 is an example illustrating defragmentation of source PSUs in an embodiment in accordance with the techniques herein.

As noted above, multiple PSUs may be initially filled with compressed data. Over time, logical addresses having corresponding original compressed data stored on a first PSU may be overwritten with new data that is subsequently stored on a newly allocated PSU as part of initially filling the newly allocated PSU. As a result, the physical storage on the first PSU used to stored the original compressed data becomes unused and denotes one or more holes or fragments in the first PSU. The foregoing fragmentation occurs with respect to many PSUs. As a result, processing may be performed using the techniques herein to defragment the one or more fragmented PSUs as will now be described with reference to the example 200 of the FIG. 5.

The example 200 includes 17 source PSUs denoted as S1-S17. Each of the source PSUs S1-S17 in the example 200 may be characterized as fragmented in that it includes good or valid data as well as one or more holes or fragments of unused physical storage not storing any valid or usable data. In the example 200, portions of a PSU which include valid or good data are denoted by black areas, and portions of a PSU which are holes or fragments are denoted by white areas.

An embodiment in accordance with the techniques herein may perform defragmentation to defragment the 17 source PSUs S1-S17. For each source PSU S1-S17, an age of the data stored on each source PSU may be determined using the first TS associated with the source PSU. Consistent with other discussion herein, the first TS denotes the most recent destaging time of any write data stored on the source PSU. Based on the age associated with each of the source PSUs S1-S17, the source PSUs S1-S17 are partitioned into one of the 5 age buckets 202, 204, 206, 208 and 210. The age buckets 202, 204, 206, 208 and 210 correspond, respectively, to the age buckets 310*a-e* of FIG. 4.

In the example 200, age bucket 1 202 includes source PSUs S1-S6 each having an age that is less than 1 minute; age bucket 2 204 incudes source PSUs S7-S10 each having an age that is greater than or equal to 1 minute and also less than 1 hour; age bucket 3 206 includes source PSUs S11-S13 each having an age that is greater than or equal to 1 hour and also less than 1 week; age bucket 4 208 includes source PSUs S14 and S15 each having an age that is greater than or equal to 1 week and also less than 1 month; and age bucket 5 210 includes source PSUs S16 and S17 each having an age that is greater than 1 month. As illustrated in the example 200, as a source PSU ages and moves into an age bucket associated with older ages, the fragmentation level decreases since the older PSUs, such as PSUs S16-S17, include data that is less likely to be overwritten than other data more recently written, for example, stored on PSUs S1-S6.

In connection with defragmentation in accordance with the techniques herein, valid data from multiple source PSUs in the same age bucket may be combined and stored on a new target PSU. Generally, data from multiple source PSUs in the same bucket may be combined and stored on one or more new target PSUs. In the example 200, there are 5 target PSUs, PSU A 220*a*-PSU E 220*e*. In the example 200, data of the source PSUs S1-S6 may be combined and relocated to the target PSU A 220*a*; data of the source PSUs S7-S10 may be combined and relocated to the target PSU B 220*b*; data of the source PSUs S11-S13 may be combined and relocated to the target PSU C 220*c*; data of the source PSUs S14-S15 may be combined and relocated to the target PSU D 220*d*; and data of the source PSUs S16-S17 may be combined and relocated to the target PSU E 220*e*.

Data on the target PSUs 220*a-e* may be stored in a tightly compacted form similar to that as described in connection with FIG. 3 with the difference that the data is being relocated from the source PSUs S1-S17 to the target PSUs 220*a-e* (in FIG. 5) rather than data that is newly destaged from the cache to fill a newly allocated PSU (as in FIG. 3). In at least one embodiment, the target PSUs 220*a-e* may not have any holes or fragments of unused physical storage.

Processing may be performed to determine values of the first TS and second TS for each of the target PSUs 220*a-e*. Consistent with discussion herein, the first TS and the second TS for one of the target PSUs 220*a-e* may be determined based on the TSs of the particular source PSUs S1-S17 having data relocated to the particular target PSU. For example, the first TS of the target PSU A 220*a* may be determined as the most recent of all the first TSs associated with the source PSUs S1-S6 having data relocated to the target PSU 220*a*, and the second TS of the target PSU A 220*a* may be determined as the oldest of all the second TSs associated with the source PSUs S1-S6 having data relocated to the target PSU 220*a*.

The first TS of the target PSU B 220*b* may be determined as the most recent of all the first TSs associated with the source PSUs S7-S10 having data relocated to the target PSU 220*b*, and the second TS of the target PSU B 220*b* may be determined as the oldest of all the second TSs associated with the source PSUs S7-S10 having data relocated to the target PSU 220*b*.

The first TS of the target PSU C 220*c* may be determined as the most recent of all the first TSs associated with the source PSUs S11-S13 having data relocated to the target PSU 220*c*, and the second TS of the target PSU C 220*c* may be determined as the oldest of all the second TSs associated with the source PSUs S11-S13 having data relocated to the target PSU 220*c*.

The first TS of the target PSU D 220*d* may be determined as the most recent of all the first TSs associated with the source PSUs S14-S15 having data relocated to the target PSU 220*d*, and the second TS of the target PSU D 220*d* may be determined as the oldest of all the second TSs associated with the source PSUs S14-S15 having data relocated to the target PSU 220*d*.

The first TS of the target PSU E 220*e* may be determined as the most recent of all the first TSs associated with the source PSUs S16-S17 having data relocated to the target PSU 220*e*, and the second TS of the target PSU E 220*e* may be determined as the oldest of all the second TSs associated with the source PSUs S16-S17 having data relocated to the target PSU 220*e*.

Once the source PSUs S1-S17 have been defragmented resulting in relocation of data to the target PSUs 220*a-e*, the source PSUs S1-S17 may be reused and reallocated in connection with storing newly destaged and compressed data such as described in connection with FIG. 3. As more rewrites are made to logical addresses having current compressed data stored on the target PSUs 220*a-e*, holes or fragments of unused storage result where the current compressed data is stored and the newly written data is stored on a newly allocated PSU such as described in connection with FIG. 3.

The foregoing defragmentation process may be periodically repeated as PSUs become fragmented. For example, at a subsequent point in time, the target PSUs 220*a-e* may become fragmented and, as a result, defragmentation processing may be performed in which the target PSUs 220*a-e* now become the source PSUs of the next iteration of defragmentation processing.

In at least one embodiment, the delta or difference between the first TS and the second TS of the source PSUs S1-S17 may be used in determining what source PSUs within the same age bucket may be combined or have their data relocated to the same target PSU. The difference between first TS and the second TS of each source PSU in a particular age bucket may be determined. Multiple source PSUs of the particular age bucket may be combined into the same target PSU if the difference between the first TS and the second TS of each source PSU to be combined does not exceed the specified maximum. Multiple source PSUs of the particular age bucket may be combined into the same target PSU if the difference between the first TS and the second TS of each source PSU is equal to or greater than the specified maximum. In this manner, within an age bucket, source PSUs combined may be selected based on the difference between the first TS and the second TS of each PSU. For example, consider age bucket 1 202. Assume that each of the source PSUs S1-S4 have an associated difference between the first TS and the second TS that is less than the specified maximum. However, each of the source PSUs S5-S6 have an associated different between the first TS and second TS that exceeds the specified maximum. In this case, data from PSUs S1-S4 may be relocated to a first target PSU and data from PSUs S5-S6 may be related to a second different target PSU. In this manner, within an age bucket, source PSUs combined may be selected based on the difference between the first TS and the second TS of each PSU.

An embodiment in accordance with the techniques herein may perform a further optimization in connection with relocated compressed data of source PSUs to target PSUs based on the average compression ratio associated with each of the source PSUs. It may be desirable to distribute or balance compressed data having different compression ratios among the target PSUs. For example, rather than having 1 target PSU for age bucket 1 202, assume there are 3 target PSUs whereby data from the source PSUs S1-S6 may be relocated to any of the 3 target PSUs. Assume that source PSUs S1-S3 are highly compressible and have high average compression ratios and that source PSUs S4-S6 have low compressibility with low average compression ratios. In this case, data may be relocated from PSUs S1 and S4 to a first target PSU to provide a mix of highly compressible data and low compressible data on the same target PSU. Data may be relocated from PSUs S2 and S5 to a second target PSU to provide a mix of highly compressible data and low compressible data on the same target PSU. Data may be relocated from PSUs S3 and S6 to a third target PSU to provide a mix of highly compressible data and low compressible data on the same target PSU.

Consistent with other discussion herein, an embodiment may include multiple storage tiers of PDs where the tiers may have an associated performance ranking. Additionally, PDs in each tier may be configured into RAID groups having different RAID levels, such as RAID-5 and RAID-6. An embodiment may use the ages (and thus age bucket) associated with the source PSUs to select a storage tier from which to allocate a target PSU, where data from the source PSUs may be relocated to the target PSU. The ages of the source PSUs may be used to select a tier having a suitable media type as well as a suitable RAID level. For example, older data, such as included in the oldest age bucket, may be stored on a PSU allocated from the lowest performance tier since the probability of overwriting such older data stored at a logical address is low. Additionally the PSU may be allocated from a RAID group having an associated RAID level, such as RAID-6, that has a high write penalty since the probability of an expected write to the logical address is low. Younger data, such as included in the youngest age bucket, may be stored on a PSU allocated from a higher performance tier (e.g., the highest performance tier or more generally any tier other than the lowest performance tier) since the probability of overwriting such younger data stored at another logical address is higher relative to the older data. Additionally, the PSU may be allocated from a RAID group having an associated RAID level other than RAID-6 in order to have a lower write penalty than that associated with a RAID-6 RAID group.

In embodiment may perform defragmentation as described herein at any suitable time and in response to any specified trigger condition. For example, an embodiment may perform defragmentation responsive to a determination that the amount of fragmented physical storage exceeds a specified level, periodically during time periods of idle system usage or workload, and the like.

Figure 6:
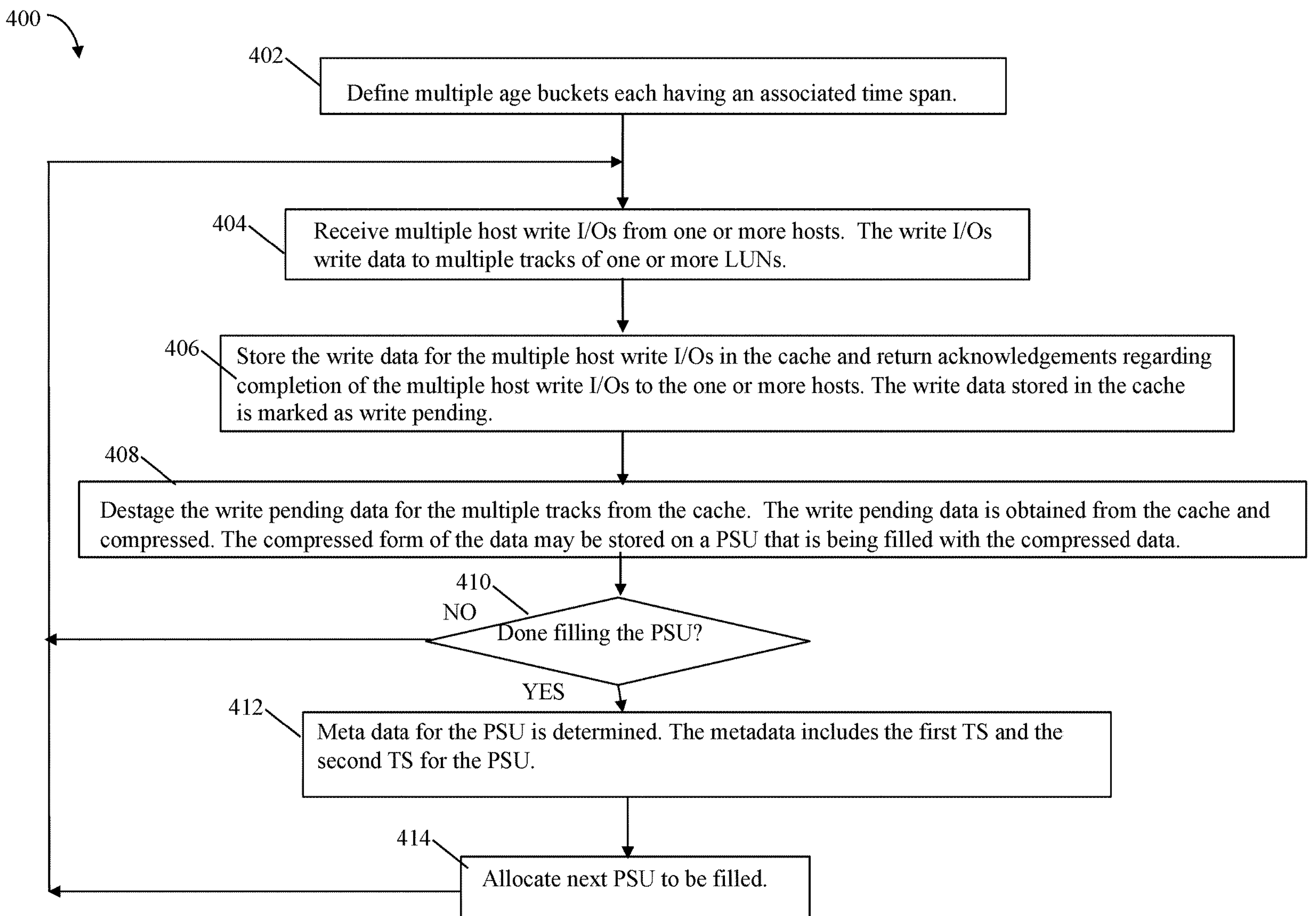
FIGS. 6 and 7 are flowcharts of processing steps that may be performed in an embodiment in accordance with the techniques herein.
Figure 7:
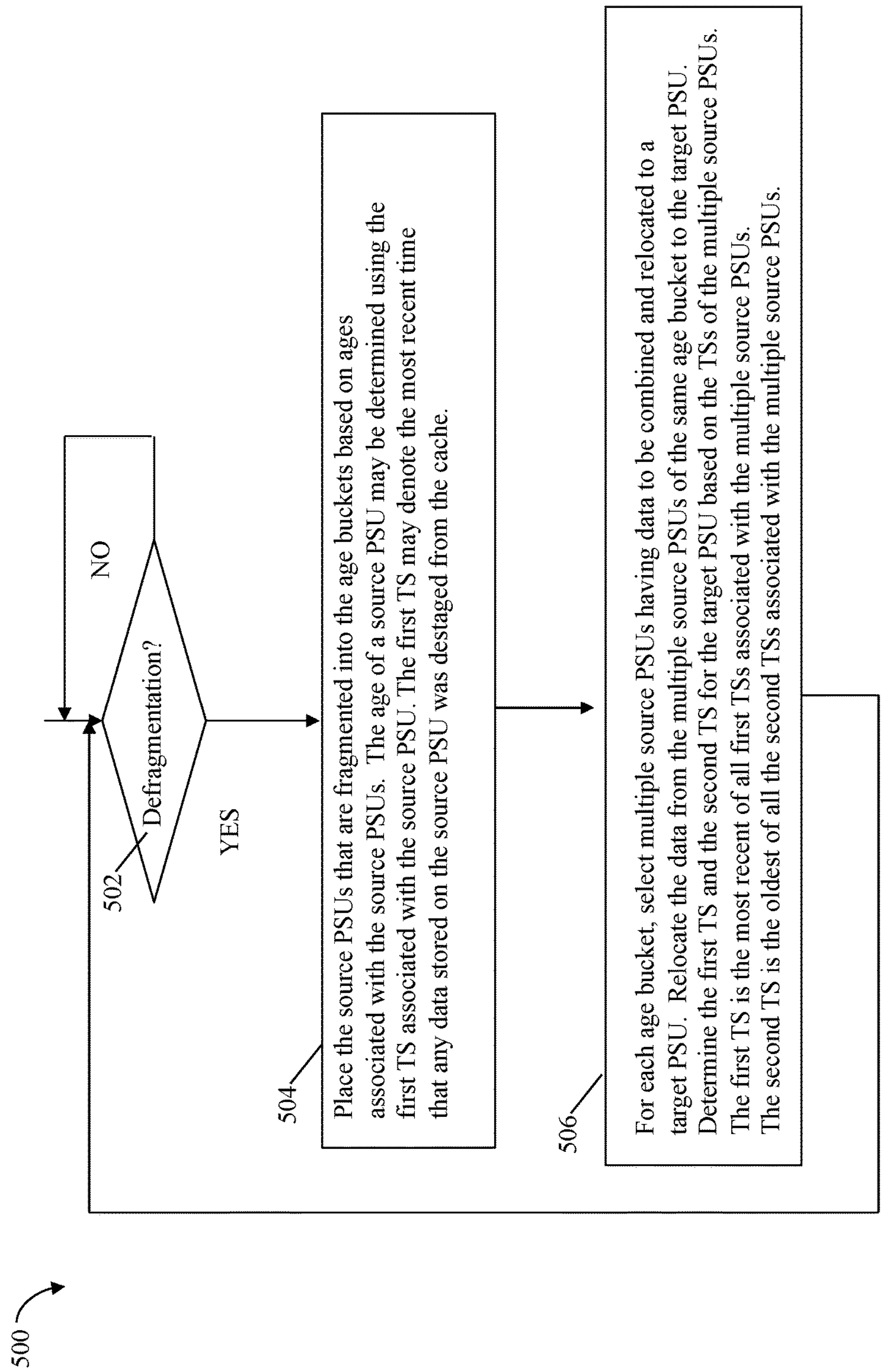

What will now be described in connection with FIGS. 6 and 7 are flowcharts of processing steps that may be performed in an embodiment in accordance with the techniques herein. The steps of the flowcharts of FIGS. 6 and 7 summarize processing described above.

Referring to FIG. 6, shown is a first flowchart 400 of processing steps that may be performed in an embodiment in accordance with the techniques herein.

At the step 402, processing is performed to define multiple age buckets each having an associated time or age span. From the step 402, control proceeds to the step 404. At the step 404, multiple host write I/Os may be received from one or more hosts. The write I/Os write data to multiple logical tracks of one or more LUNs. From the step 404, control proceeds to the step 406.

At the step 406, processing is performed to store the write data for the multiple host write I/Os in the cache and return acknowledgements regarding completion of the multiple host write I/Os to the one or more hosts. The write data stored in the cache is marked as write pending. From the step 406, control proceeds to the step 408. At the step 408, processing is performed to destage the write pending data for the multiple tracks from the cache. The write pending data is obtained from the cache and compressed. The compressed form of the data may be stored on a PSU that is currently being filled with the compressed data. From the step 408, control proceeds to the step 410.

At the step 410, a determination is made as to whether processing has completed for filling the PSU current PSU. If the step 410 evaluates to no, control proceeds to the step 404. If the step 410 evaluates to yes, control proceeds to the step 412 where metadata for the PSU may be determined. The metadata may include the first TS and the second TS for the PSU. The first TS denotes the time that the compressed data is stored on the PSU. Since the compressed data is generated from write pending data destaged from the cache, the first TS also denotes the most recent destaging time of any compressed write data stored on the PSU. The second TS may be set to the first TS. From the step 412, control proceeds to the step 413 where the next PSU to be filled is allocated. From the step 414, control proceeds to the step 404 to process the next received write I/O operations.

Referring to FIG. 7, shown is a second flowchart 500 of processing steps that may be performed in an embodiment in accordance with the techniques herein.

At the step 502, a determination is made as to whether it is time to perform defragmentation. If the step 502 evaluates to no, control remains at the step 502. If the step 502 evaluates to yes, control proceeds to the step 504. At the step 504, processing is performed to place the source PSUs that are fragmented into the age buckets based on ages associated with the source PSUs. The age of a source PSU may be determined using the first TS associated with the source PSU. The first TS may denote the most recent time that any data stored on the source PSU was destaged from the cache. From the step 504, control proceeds to the step 506.

At the step 506, for each age bucket, processing is performed to select multiple source PSUs having data to be combined and relocated to a target PSU. The data is relocated from the multiple source PSUs of the same age bucket to the target PSU. The step 506 includes determining the first TS and the second TS for the target PSU based on the TSs of the multiple source PSUs. The first TS may be determined as the most recent of all first TSs associated with the multiple source PSUs. The second TS may be determined as the oldest of all the second TSs associated with the multiple source PSUs.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method of processing data comprising:

receiving a plurality of source physical storage allocation units, wherein each of the plurality of source physical storage allocation units includes valid data, includes one or more holes of unused physical storage, and has an associated timestamp denoting a most recent destaging time of any data stored on said each source physical storage allocation unit;

determining an age for each of the plurality of source physical allocation units based on the associated timestamp of said each source physical allocation unit;

for each of the plurality of source physical storage allocation units, determining one of a plurality of age buckets for said each source physical allocation unit based on the age of said each source physical allocation unit; and for a first of the plurality of age buckets including two of the plurality of source physical allocation units, performing first processing including:

relocating at least some valid data from the two source physical storage allocation units to a target physical storage allocation unit.

2. The method of claim 1, wherein the first processing includes determining a timestamp for the target physical storage allocation unit using at the two associated timestamps for the two source physical storage allocation units.

3. The method of claim 2, wherein the timestamp for the target physical storage allocation unit is determined as a most recent one of the two associated timestamps for the two source physical storage allocation units.

4. The method of claim 1, wherein the at least some valid data from the two source physical storage allocation units is stored on the target physical storage allocation unit in a compact packed format and wherein the target physical storage allocation unit has no holes of unused physical storage.

5. The method of claim 1, wherein each of the plurality of source physical allocation units includes compressed data.

6. The method of claim 1, further comprising:

receiving a plurality of write I/O operations that write first data to a plurality of logical addresses;

storing the first data in a cache;

obtaining the first data from the cache;

compressing the first data obtained from the cache and generating first compressed data;

storing the first compressed data on a first of the plurality of source physical storage allocation units in a compact packed format; and determining the associated timestamp for the first source physical storage allocation unit denoting a destaging time of the first data stored on the first physical storage allocation unit.

7. The method of claim 6, wherein, at a first point in time, each of the first source physical storage allocation unit and a second of the plurality of physical storage allocation units includes valid data stored in a compact packed format.

8. The method of claim 7, wherein the first physical storage allocation unit includes a first number of compressed data portions and the second physical storage allocation unit includes a second number of compressed data portions, and wherein the second number is different than the first number.

9. The method of claim 7, wherein the first physical storage allocation unit includes a first amount of compressed data and the second physical storage allocation unit includes a second amount of compressed data, and wherein the first amount is different than the second amount.

10. The method of claim 1, wherein the target physical storage allocation unit is allocated from a first of a plurality of storage tiers, and wherein the first storage tier is selected in accordance with the first age bucket including the two source physical allocation units.

11. The method of claim 10, wherein the first age bucket denotes an oldest age with respect to a plurality of ages associated with the plurality of age buckets.

12. The method of claim 11, wherein the first storage tier is a lowest performance tier of the plurality of storage tiers.

13. The method of claim 10, wherein the first age bucket denotes a youngest age with respect to a plurality of ages associated with the plurality of age buckets.

14. The method of claim 11, wherein the plurality of storage tiers are ranked in terms of performance from a highest performance ranked one of the plurality of tiers to a lowest performance ranked one of the plurality of tiers, and wherein the first storage tier is any of the plurality of tiers other than the lowest performance ranked one of the plurality of storage tiers.

15. A system comprising:

one or more processors; and a memory comprising code stored thereon that, when executed, performs a method of processing data comprising:

receiving a plurality of source physical storage allocation units, wherein each of the plurality of source physical storage allocation units includes valid data, includes one or more holes of unused physical storage, and has an associated timestamp denoting a most recent destaging time of any data stored on said each source physical storage allocation unit;

determining an age for each of the plurality of source physical allocation units based on the associated timestamp of said each source physical allocation unit;

for each of the plurality of source physical storage allocation units, determining one of a plurality of age buckets for said each source physical allocation unit based on the age of said each source physical allocation unit; and for a first of the plurality of age buckets including two of the plurality of source physical allocation units, performing first processing including:

relocating at least some valid data from the two source physical storage allocation units to a target physical storage allocation unit.

16. A computer readable medium comprising code stored thereon that, when executed, performs a method of processing data comprising:

receiving a plurality of source physical storage allocation units, wherein each of the plurality of source physical storage allocation units includes valid data, includes one or more holes of unused physical storage, and has an associated timestamp denoting a most recent destaging time of any data stored on said each source physical storage allocation unit;

determining an age for each of the plurality of source physical allocation units based on the associated timestamp of said each source physical allocation unit;

for each of the plurality of source physical storage allocation units, determining one of a plurality of age buckets for said each source physical allocation unit based on the age of said each source physical allocation unit; and for a first of the plurality of age buckets including two of the plurality of source physical allocation units, performing first processing including:

relocating at least some valid data from the two source physical storage allocation units to a target physical storage allocation unit.

17. The computer readable medium of claim 16, wherein the first processing includes determining a timestamp for the target physical storage allocation unit using at the two associated timestamps for the two source physical storage allocation units.

18. The computer readable medium of claim 17, wherein the timestamp for the target physical storage allocation unit is determined as a most recent one of the two associated timestamps for the two source physical storage allocation units.

19. The computer readable medium of claim 16, wherein the at least some valid data from the two source physical storage allocation units is stored on the target physical storage allocation unit in a compact packed format and wherein the target physical storage allocation unit has no holes of unused physical storage.

20. The computer readable medium of claim 16, wherein each of the plurality of source physical allocation units includes compressed data.

* * * * *